(12) United States Patent
Ohbitsu

(10) Patent No.: US 8,811,804 B2
(45) Date of Patent: Aug. 19, 2014

(54) METHODS AND SYSTEMS FOR REDUCING MOVING IMAGE DATA VOLUME WHILE MAINTAINING LUMINANCE DATA OF THE MOVING IMAGE

(75) Inventor: Toshiro Ohbitsu, Kawasaki (JP)

(73) Assignee: Fujitsu Limited, Kawasaki-shi (JP)

( * ) Notice: Subject to any disclaimer, the term of this patent is extended or adjusted under 35 U.S.C. 154(b) by 177 days.

(21) Appl. No.: 13/004,605

(22) Filed: Jan. 11, 2011

(65) Prior Publication Data

US 2011/0200296 A1  Aug. 18, 2011

(30) Foreign Application Priority Data

Feb. 16, 2010  (JP) .................................. 2010-031569

(51) Int. Cl.
| | |
|---|---|
| *H04N 9/81* | (2006.01) |
| *H04N 5/765* | (2006.01) |
| *H04N 7/26* | (2006.01) |
| *H04N 5/781* | (2006.01) |
| *H04N 21/4143* | (2011.01) |
| *H04N 5/445* | (2011.01) |
| *H04N 21/4402* | (2011.01) |

(52) U.S. Cl.
CPC .............. *H04N 5/781* (2013.01); *H04N 5/765* (2013.01); *H04N 19/00206* (2013.01); *H04N 19/00315* (2013.01); *H04N 19/00533* (2013.01); *H04N 19/00127* (2013.01); *H04N 21/4143* (2013.01); *H04N 5/44513* (2013.01); *H04N 21/44029* (2013.01)
USPC .......................................... 386/300; 386/219

(58) Field of Classification Search
None
See application file for complete search history.

(56) References Cited

U.S. PATENT DOCUMENTS 5,933,131 A * 8/1999 Rich .............................. 345/605

FOREIGN PATENT DOCUMENTS

| JP | 10-308923 | | 11/1998 |
| JP | 11-146398 | A | 5/1999 |
| JP | 2000-181438 | A | 6/2000 |

OTHER PUBLICATIONS

Office Action issued on Nov. 26, 2013 in the corresponding Japanese Patent Application No. 2010-031569 (with English Translation).
Office Action mailed May 27, 2014, in Japanese Patent Application No. 2010-031569 (with English language translation).

* cited by examiner

*Primary Examiner* — Huy T Nguyen
*Assistant Examiner* — Eileen Adams
(74) *Attorney, Agent, or Firm* — Oblon, Spivak, McClelland, Maier & Neustadt, L.L.P.

(57) ABSTRACT

A moving image reproducing apparatus includes a moving image obtaining part which obtains first moving image data having, luminance data representing luminance of an image, and color data representing color of the image, a color data reduction part which generates second moving image data having the same luminance data as the luminance data of the first moving image data and color data whose data volume is reduced, by reducing a data volume of the color data of the first moving image data, a moving image generation part which generates third moving image data for moving image display, on the basis of the second moving image data, and a moving image output part which outputs the third moving image data.

19 Claims, 13 Drawing Sheets

| SMB LINE 1 EVEN NUMBER |
| SMB LINE 2 EVEN NUMBER |
| SMB LINE 3 EVEN NUMBER |
| SMB LINE 4 EVEN NUMBER |
| SMB LINE 1 ODD NUMBER |
| SMB LINE 2 ODD NUMBER |
| SMB LINE 3 ODD NUMBER |
| SMB LINE 4 ODD NUMBER |

| SMB LINE 1 EVEN NUMBER |
| SMB LINE 2 EVEN NUMBER |
| SMB LINE 3 EVEN NUMBER |
| SMB LINE 4 EVEN NUMBER |
| SMB LINE 1 ODD NUMBER |
| SMB LINE 2 ODD NUMBER |
| SMB LINE 3 ODD NUMBER |
| SMB LINE 4 ODD NUMBER |

| B | B | ... | B | B |
| B | B | ... | B | B |
| NO DATA | NO DATA | ... | NO DATA | NO DATA |
| NO DATA | NO DATA | ... | NO DATA | NO DATA |

| B | B | ... | B | B |
| B | B | ... | B | B |
| NO DATA | NO DATA | ... | NO DATA | NO DATA |
| NO DATA | NO DATA | ... | NO DATA | NO DATA |

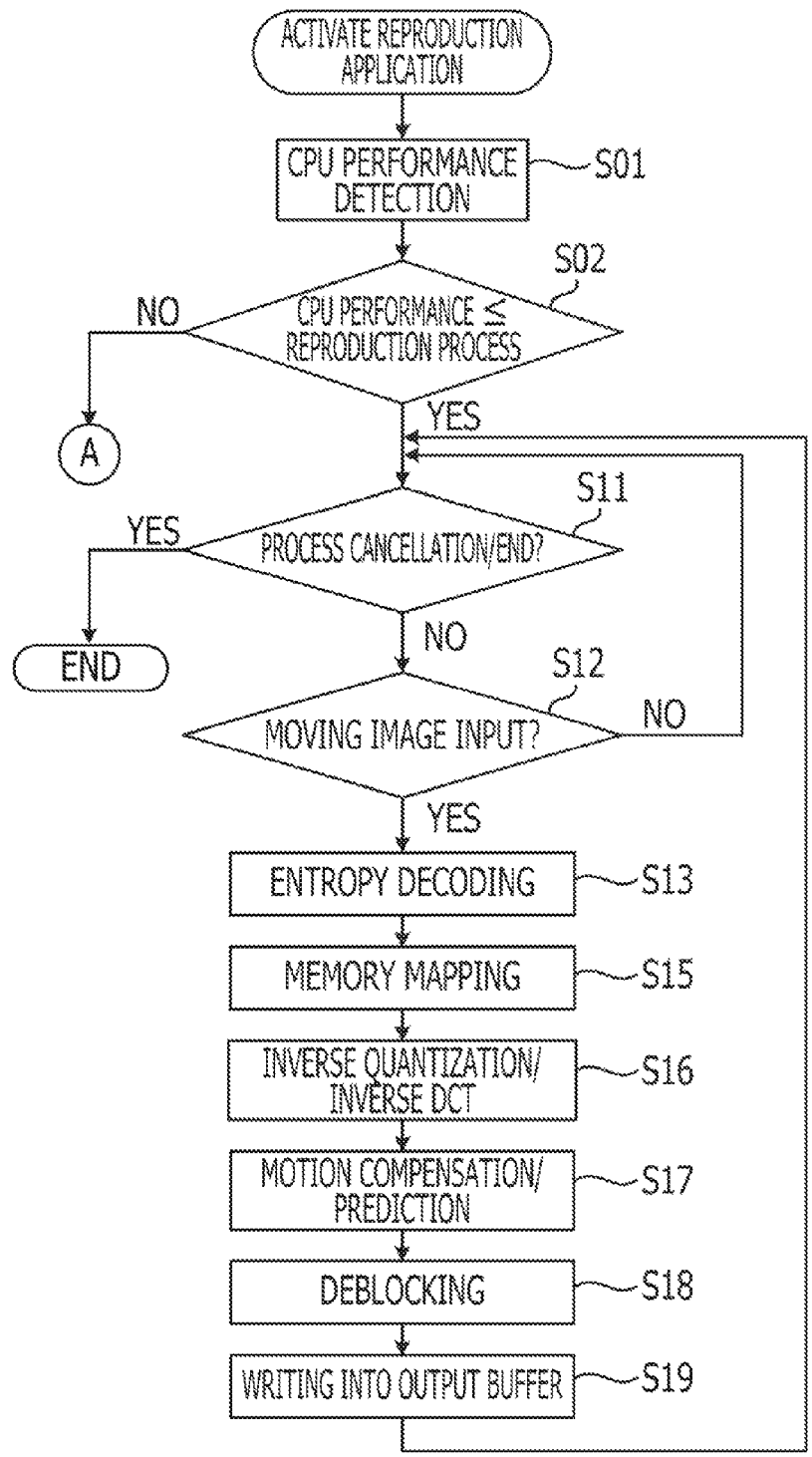

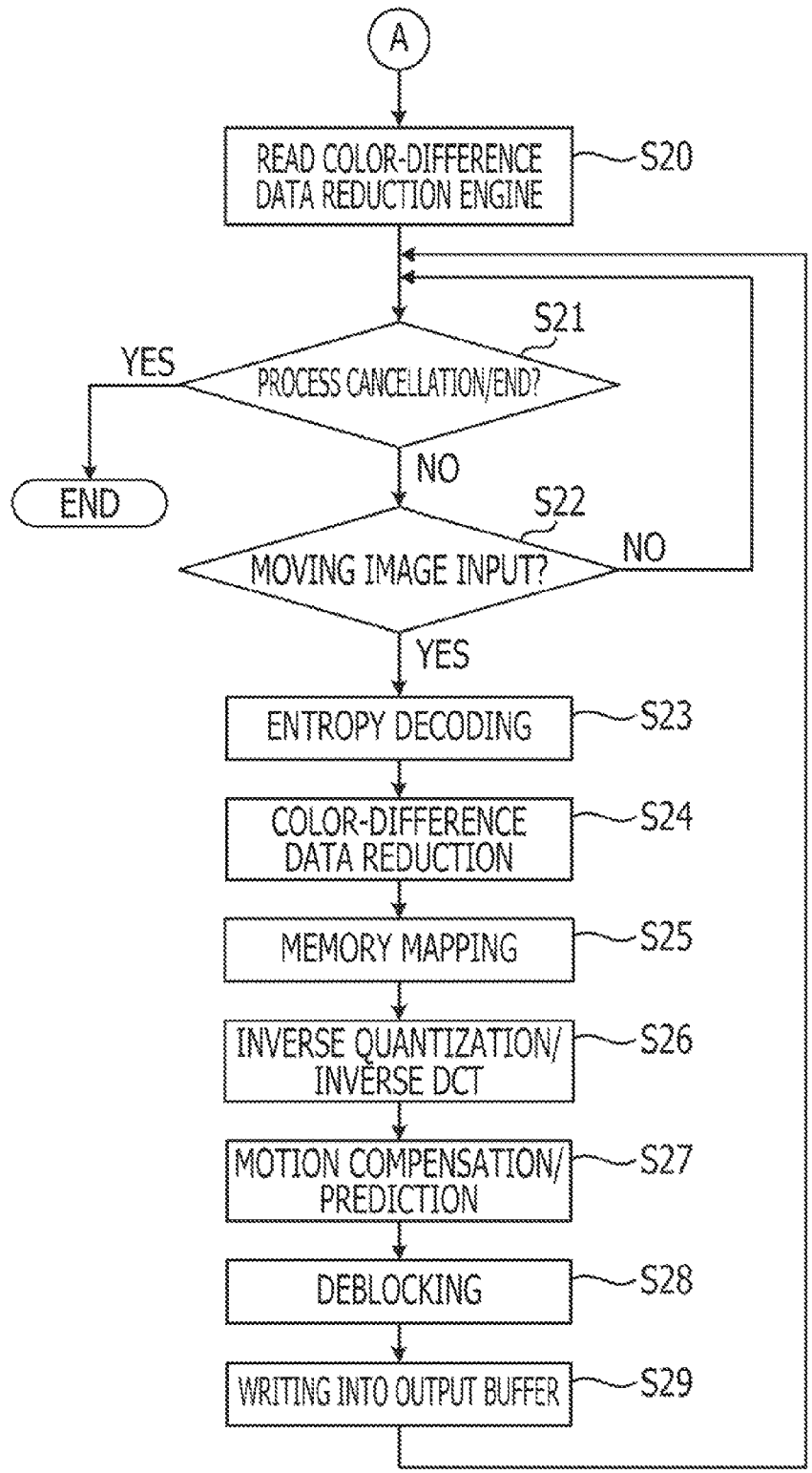

METHODS AND SYSTEMS FOR REDUCING MOVING IMAGE DATA VOLUME WHILE MAINTAINING LUMINANCE DATA OF THE MOVING IMAGE

CROSS-REFERENCE TO RELATED APPLICATIONS

This application is based upon and claims the benefit of priority of the prior Japanese Patent Application No. 2010-31569, filed on Feb. 16, 2010, the entire contents of which are incorporated herein by reference.

BACKGROUND

In recent years, orientation toward low-price personal computers (hereinafter, abbreviated as "PC") is becoming strong. In order to reduce the price of a PC, the prices of parts used in the PC are reduced, and the performance of the PC is reduced accordingly. For example, in low-price laptop personal computers (hereinafter, abbreviated as "laptop PC"), for example, a 1.6 GHz CPU which is far from a high speed CPU in recent years is used as a CPU (Central Processing Unit) which executes a program.

Here, it is assumed that a moving image content, which has 1280×720, 4:2:2 format and 30 frames and is a high-definition moving image content for distribution on the Internet, is reproduced. When the moving image content of this level is processed by, for example, a 2.2 GHz CPU, the CPU utilization is about 81%, and this is close to the limit in view of the entire system. When the moving image content is reproduced by a low-spec laptop PC as described above, the CPU utilization is about 111% by simple calculation in the case of a 1.6 GHz CPU. Thus, the CPU may not keep up with processing, and the moving image content is displayed with dropping frames, or a video image is not outputted but frozen.

In order to avoid occurrence of this defect, it has been proposed that a part of an inverse DCT process of an MPEG image data is skipped in accordance with a reproduction processing load and the load is suppressed, thereby reducing the possibility of dropping frames. However, in this case, when the load is reduced, the image resolution is reduced and a reproduced image may be blurred.

Moreover, it has been proposed that image data in multiple formats, such as YUV 4:2:4, YUV 4:2:2, and YUV 4:2:0, whose data volumes of color data are different from each other, are prepared, and, out of image data in these multiple formats, image data which is a target to be transformed to image data for display is changed for each one frame in accordance with a load. In this case, the color resolution of a video image may be reduced when the load is reduced, but the video image itself is reproduced with high resolution remained. However, in this case, it is necessary to prepare image data in multiple formats. Thus, this may cause an increase in communication traffic of the Internet or an increase in necessary storage capacity. In addition, for image data distributed on the Internet or the like, data in such multiple formats are not prepared in parallel (e.g., Japanese Unexamined Patent Application Publication No. 1999-146398 and Japanese Unexamined Patent Application Publication No. 2000-181438).

SUMMARY

According to an aspect of the invention, a moving image reproducing apparatus includes a moving image obtaining unit which obtains first moving image data having, luminance data representing luminance of an image; and color data representing color of the image, a color data reduction unit which generates second moving image data having the same luminance data as the luminance data of the first moving image data and color data whose data volume is reduced, by reducing a data volume of the color data of the first moving image data, a moving image generation unit which generates third moving image data for moving image display, on the basis of the second moving image data, and a moving image output unit which outputs the third moving image data.

The object and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 8A and 8B are diagrams illustrating an example of Cb and Cr data on a memory in 4:2:2 format.

FIGS. 9A and 9B are diagrams illustrating an arrangement example of CbCr data on the memory in 4:2:0 format.

FIG. 10 is a flowchart of a reproduction application.

FIG. 11 is another flowchart of the reproduction application.

DESCRIPTION OF EMBODIMENTS

Hereinafter, embodiments of the present case will be described.

Figure 1:
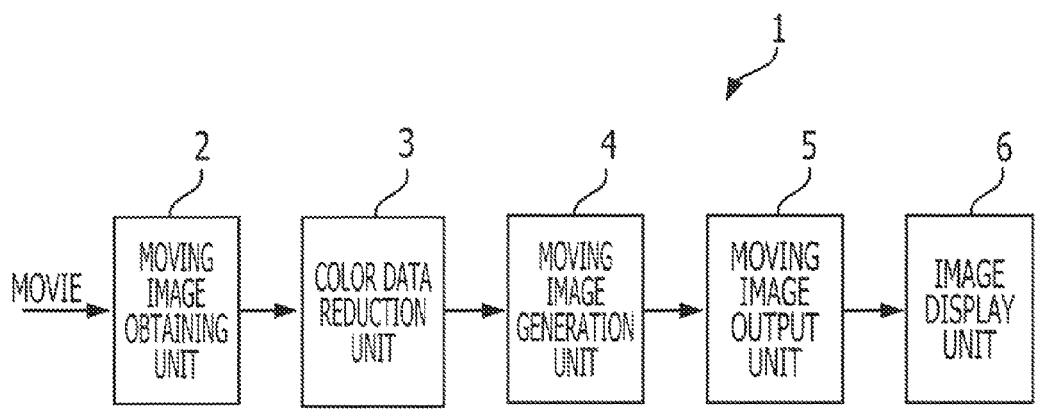
FIG. 1 is a configuration diagram of a moving image reproducing apparatus according to a first embodiment of the present case.

FIG. 1 is a configuration diagram of a moving image reproducing apparatus according to a first embodiment of the present case.

The moving image reproducing apparatus 1 includes: an arithmetic processing unit which executes a program; and a moving image reproducing program which is executed in the arithmetic processing unit. FIG. 1 illustrates functions which are implemented in the arithmetic processing unit by the moving image reproducing program being executed in the arithmetic processing unit. The moving image reproducing apparatus 1 includes a moving image obtaining unit 2, a color data reduction unit 3, a moving image generation unit 4, a moving image output unit 5, and an image display unit 6.

The moving image obtaining unit 2 obtains first moving image data which includes: luminance data representing luminance of an image; and color data representing color of the image. The moving image data is obtained via a communication line such as a computer network (e.g., the Internet), or by installation from a portable storage medium such as a DVD (Digital Versatile Disk).

The color data reduction unit 3 generates second moving image data which includes: the same luminance data as the luminance data of the first moving image data; and color data whose data volume is reduced, by reducing the data volume of the color data of the first moving image data obtained by the moving image obtaining unit 2.

The moving image generation part 4 generates third moving image data for moving image display, on the basis of the second moving image data generated by the color data reduction unit 3.

The moving image output unit 5 outputs the third moving image data generated by the moving image generation unit 4.

Here, the moving image output unit 5 outputs the third moving image data to the image display unit 6.

The image display unit 6 receives the third moving image data outputted from the moving image output unit 5, and displays a moving image based on the third moving image data.

Here, the color data reduction unit 3 reduces the data volume of the color data of the first moving image data when the following condition is satisfied. In other words, in the color data reduction unit 3, it is determined whether or not the first moving image data obtained by the moving image obtaining unit 2 is moving image data in a data format which exceeds a moving image generation processing capacity at the moving image generation unit 4. Then, when the first moving image data is the moving image data in the data format which exceeds the moving image generation processing capacity at the moving image generation unit 4, the data volume of the color data of the first moving image data is reduced to a data volume corresponding to the moving image generation processing capacity at the moving image generation unit 4.

The above first embodiment may be taken as a moving image reproducing method which sequentially performs functions which are performed sequentially at each of the units 2 to 6 of the moving image reproducing apparatus 1 shown in FIG. 1. Here, the description overlaps, and thus illustration and description of the moving image reproducing method corresponding to the first embodiment are omitted.

The following will describe a more specific second embodiment.

Figure 2:
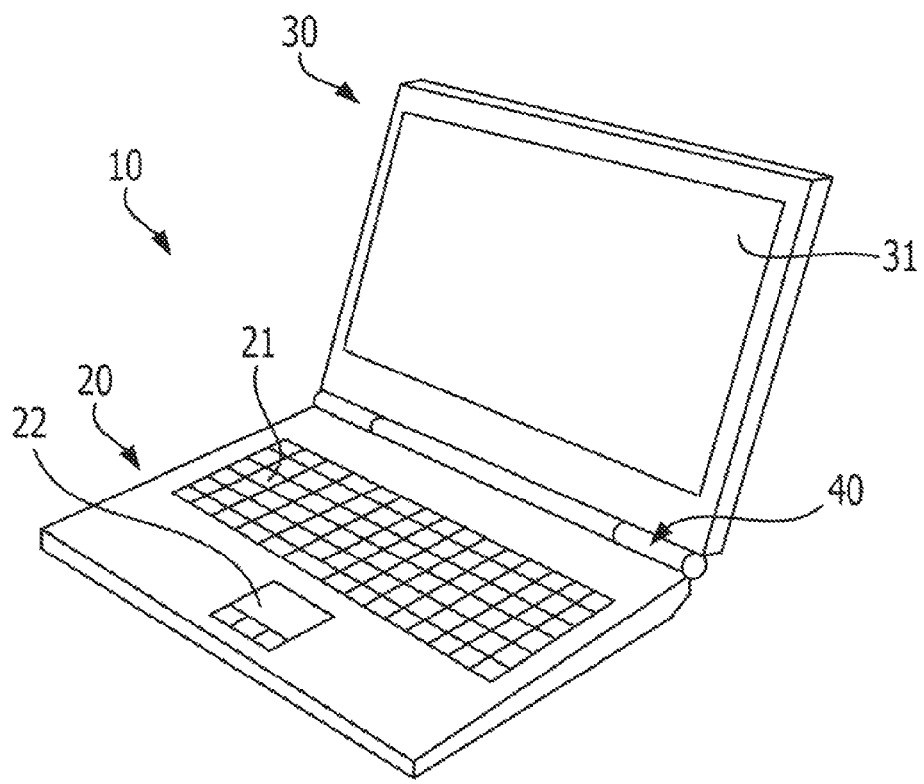
FIG. 2 is an external perspective view illustrating an example of a laptop PC in which a second embodiment of the present case is constructed.

FIG. 2 is an external perspective view illustrating an example of a laptop PC in which the second embodiment of the present case is constructed.

The laptop PC 10 shown in FIG. 2 includes a body unit 20 and a display unit 30. The body unit 20 includes a CPU, a hard disk drive (hereinafter, abbreviated as "HDD"), and the like therein, and includes a keyboard 21, a touch pad 22, which is a kind of a pointing device, and the like on its top surface. In addition, the display unit 30 is connected to the body unit 20 through a hinge 40 so as to be opened or closed relative to the body unit 20, and has a display screen 31 on its front surface when being in an opened state.

Figure 3:
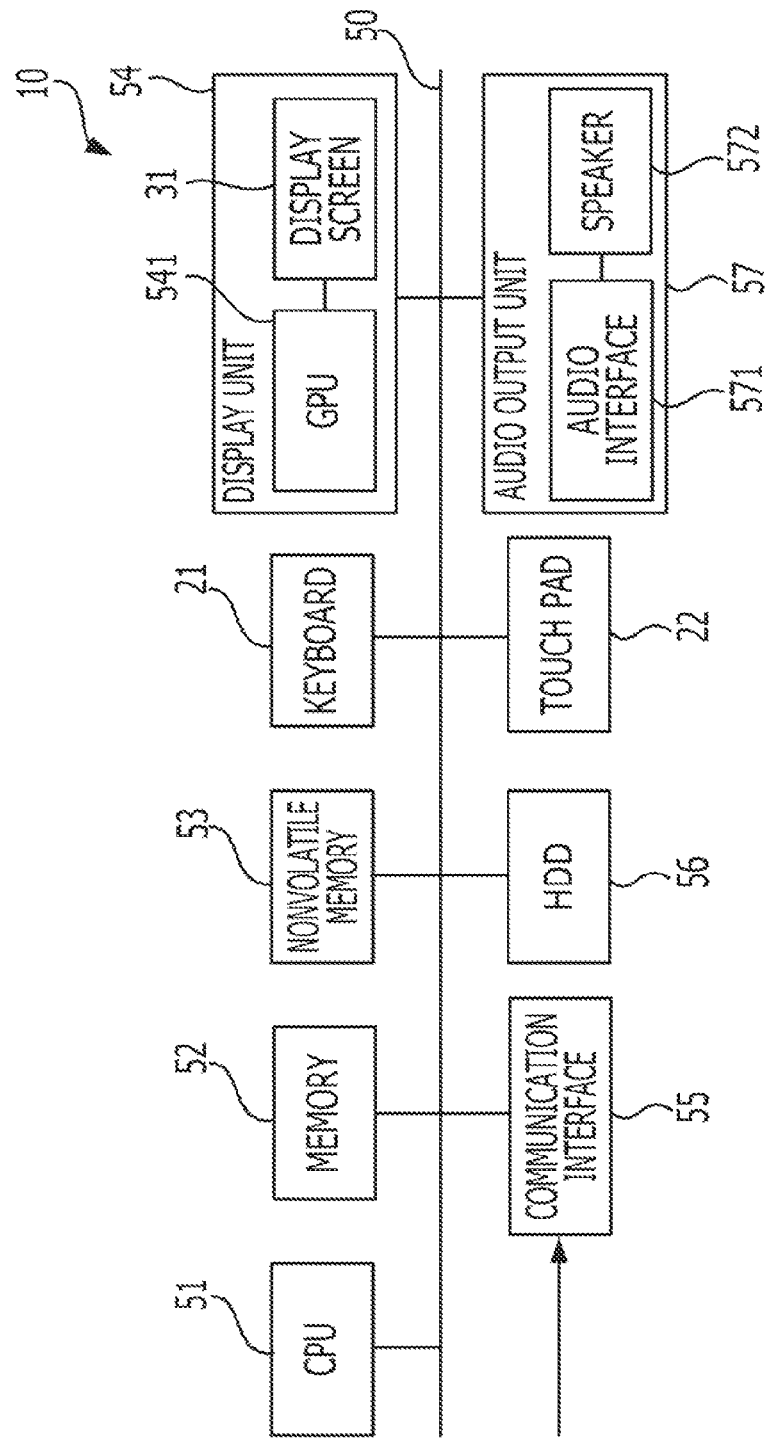
FIG. 3 is a block diagram illustrating an outline of a hardware configuration of the laptop PC whose appearance is shown in FIG. 2.

FIG. 3 is a block diagram illustrating an outline of a hardware configuration of the laptop PC whose appearance is shown in FIG. 2.

In FIG. 3 shown are a CPU 51, a memory 52, a nonvolatile memory 53, the keyboard 21 shown in FIG. 2, and a display unit 54 which includes a GPU (Graphic Processing Unit) 541 and the display screen 31 shown in FIG. 2. In addition, in FIG. 3 shown are a communication interface 55, an HDD 56, the touch pad 22 shown in FIG. 2, and an audio output unit 57 which includes an audio interface 571 and a speaker 572. These components 21, 22, and 51 to 57 are connected to each other through a bus 50.

The communication interface 55 is connected to a computer network, such as the Internet, and performs communication through the computer network. Here, in particular, the communication interface 55 receives a moving image content conforming to MPEG2. The moving image content includes audio data and image data which includes luminance data Y and color-difference data Cb and Cr. The HDD 56 is a mass storage device, and various programs including a moving image reproducing program as one embodiment of the present case, moving image contents inputted through the computer network, and the like are stored therein. The touch pad 22 is a kind of a pointing device which moves a cursor on the display screen 31 (see FIG. 2) of the display unit 54 and clicks on an optional icon or the like on the display screen 31. The audio output unit 57 receives audio data, transforms the audio data into an analogue audio signal by the audio interface 571, and outputs a sound by the speaker 572.

Further, the CPU 51 is a central processing unit which executes a program. The laptop PC used in the embodiment employs a CPU having an operating speed of 1.6 GHz which is relatively slow. The memory 52 is a memory into which a program read from the HDD 56 is expanded to be executed on the CPU 51. In addition, the memory 52 is also used as a temporary storage location for data when the program is executed on the CPU 51. In the nonvolatile memory 53, a BIOS (Basic Input Output System), which is a program executed initially when power is applied to the laptop PC 10, is stored. Further, the keyboard 21 is a tool for inputting various information and instructions by an operator.

The display unit 54 receives display data and displays an image corresponding to the data, on the display screen 31 (see FIG. 2). Here, in particular, the display unit 54 receives moving image data, transforms the moving image data into moving image data for display by the GPU 541, and displays a moving image on the display screen 31.

Here, a moving image content in MPEG2 format is received by the communication interface 55 through a computer network, (e.g., the Internet). After the moving image content is received by the communication interface 55, the moving image content is temporarily stored in the HDD 56. Then, moving image data for reproduction is generated from the moving image content, and a moving image based on the moving image data for reproduction is displayed on the display screen 31 (see FIG. 2).

Further, audio data in the moving image content is transmitted to the audio output unit 57, and a sound is outputted from the speaker 572 in synchronization with the moving image on the display screen 31.

Figure 4:
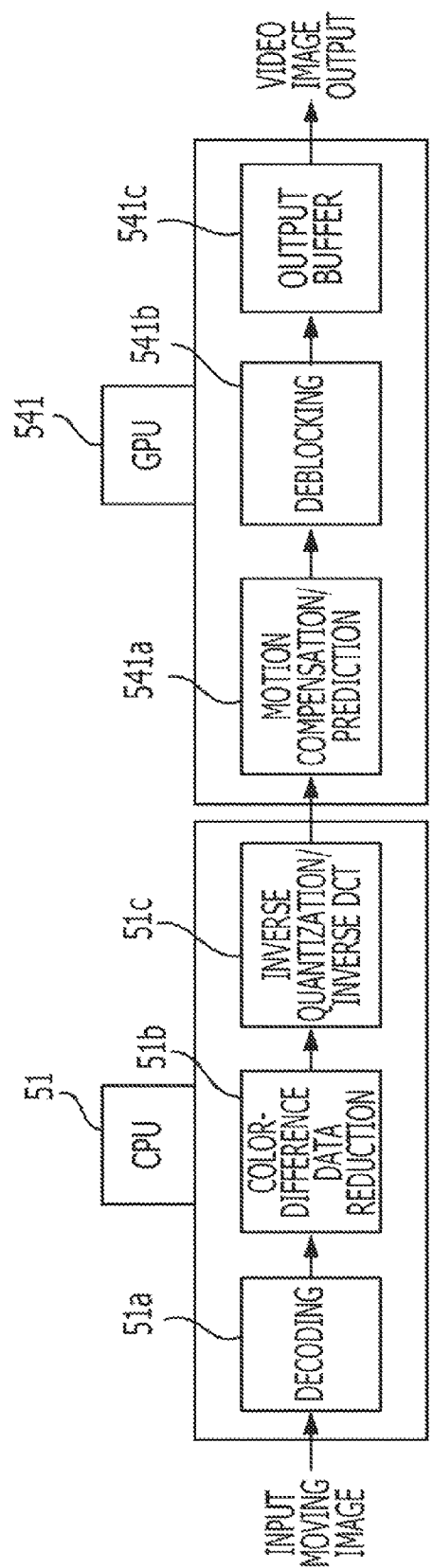
FIG. 4 is a diagram illustrating a flow of a moving image reproducing process in the laptop PC shown in FIGS. 2 and 3.

FIG. 4 is a diagram illustrating a flow of a moving image reproducing process in the laptop PC 10 shown in FIGS. 2 and 3.

After the CPU 51 receives input moving image data, a decoding process 51*a* is performed in the CPU 51. The input moving image data is data in an encrypted format, and moving image data in YCbCr format is generated in the decoding process 51*a* by a decoding process called an entropy decoding process. In the moving image data in YCbCr format which is generated by the decoding process 51*a*, Y data represents luminance of a moving image. In addition, in the moving image data in YCbCr format, CbCr data is referred to as color-difference data, and represents color of the moving image. The data volume of the CbCr data is reduced by a color-difference data reduction process 51*b*. Note that, when the processing capacity of the CPU 51 is sufficiently high and it is possible to process the input moving image data, the process of reducing the CbCr data is not performed. The Y data and the reduced CbCr data are written into the memory 52 shown in FIG. 2. Next, an inverse quantization/inverse DCT process 51*c* is performed in the CPU 51. The inverse quantization process and the inverse DCT process are general processes in a data reproducing process for MPEG format, and thus the detailed description thereof is omitted.

Here, data formats of the YCbCr data will be described.

Figure 5:
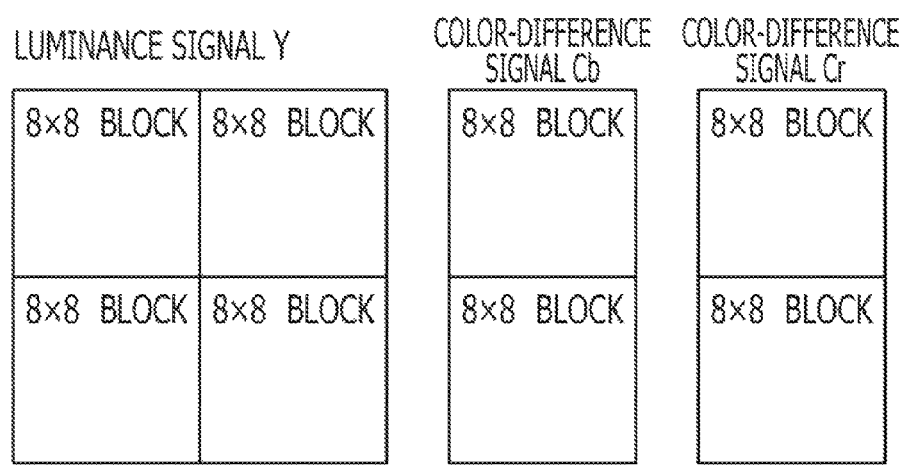
FIG. 5 is a diagram illustrating 4:2:2 format out of data formats of YCbCr data.

FIG. 5 is a diagram illustrating 4:2:2 format out of the data formats of the YCbCr data.

Some of the data formats of the YCbCr data are known. In the case of 4:2:2 format which is one of them, as one example, while Y data is composed of four blocks each having an 8×8 size, Cb data is composed of two blocks each having the same 8×8 size, and Cr data is also composed of two blocks each having an 8×8 size.

In 4:2:2 format, when numbers 1, 2, 3, 4, 5, . . . are assigned to pixels arranged horizontally, information for all the pixels is recorded in the Y data, and information for every other pixel, such as for 1, 3, 5, 7, . . . , is recorded in the Cb and Cr data. At reproduction, data is copied for every other pixel and used such that data for the first pixel is used for the first pixel and the second pixel. By so doing, each of the data volumes of the Cb and Cr data is only half that of the Y data as shown in FIG. 5.

Figure 6:
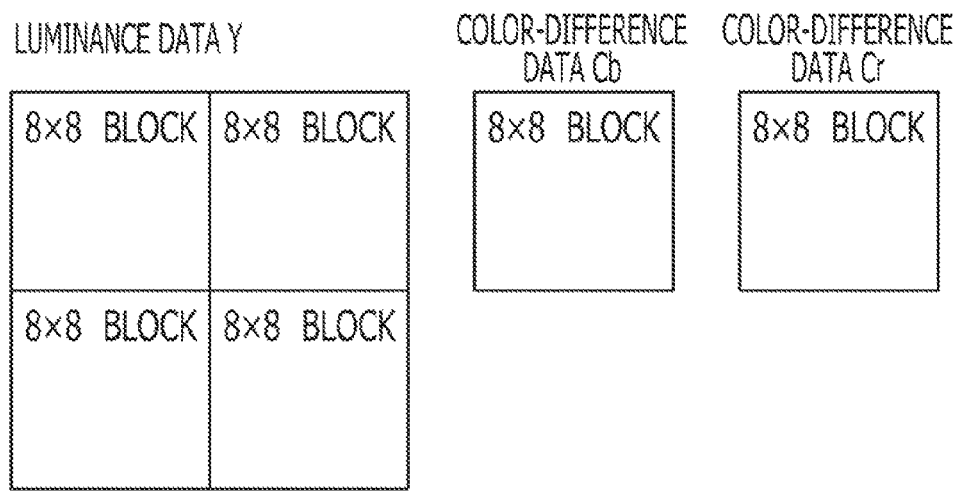
FIG. 6 is a diagram illustrating 4:2:0 format out of the data formats of the YCbCr data.

FIG. 6 is a diagram illustrating 4:2:0 format out of the data formats of the YCbCr data.

In the case of 4:2:0 format, as an example, while Y data is composed of four blocks each having an 8×8 size, each of Cb data and Cr data is composed of one block having the same 8×8 size.

In 4:2:0 format, in the Cb and Cr data, Cb data for odd numbers and Cr data for even numbers are alternatively recorded in the vertical direction of an image. At reproduction, data is copied to where data is insufficient. Thus, in 4:2:0 format, each of the data volumes of the Cb data and the Cr data is ½ of that of 4:2:2 format shown in FIG. 5.

Figure 7A:
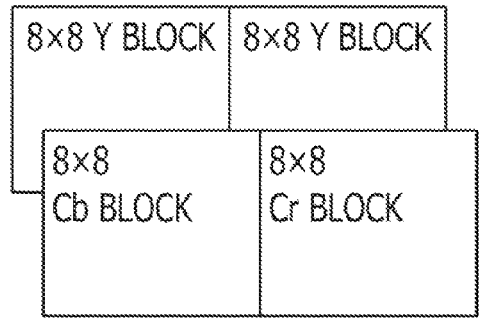
FIGS. 7A to 7C are diagrams illustrating data volume ratios of Y data and Cb and Cr data.
Figure 7B:
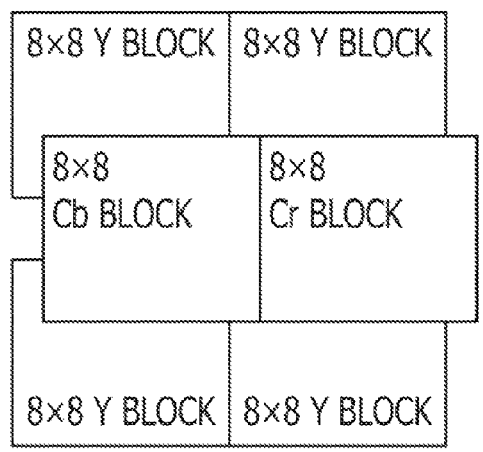
Figure 7C:
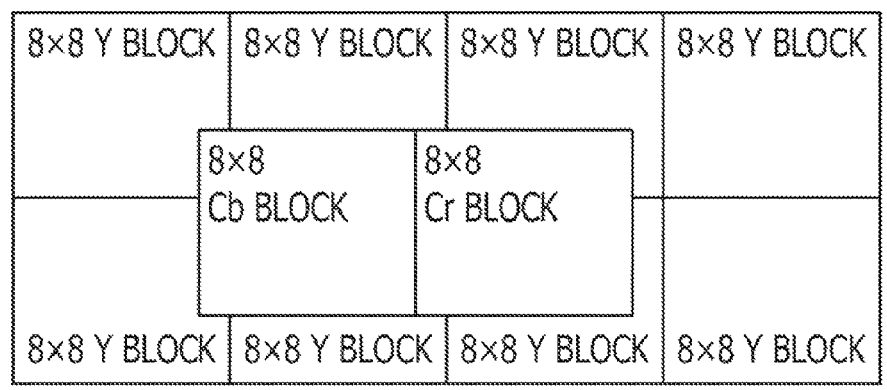

FIGS. 7A to 7C are diagrams illustrating data volume ratios of Y data and Cb and Cr data.

FIG. 7A illustrates 4:2:2 format. According to the ratio, while Y data is composed of two blocks, Cb data is composed of one block and Cr data is composed of one block.

In addition, FIG. 7B illustrates 4:2:0 format. While Y data is composed of four blocks, Cb data is composed of one block and Cr data is composed of one block.

Although no general definition is found as a data format, when the idea of the data formats in FIGS. 7A and 7B is expanded, it is thought that, while Y data is composed of eight blocks, Cb data is composed of one block and Cr data is composed of one block, as shown in FIG. 7C. It is also thought that, at reproduction, CbCr data is copied and used for where data is insufficient. Here, the data format in FIG. 7C is referred to as 4:1:0 format.

Here, as described with reference to FIG. 4, the decoding process 51*a* is performed in the CPU 51, and YCbCr data after the decoding process 51*a* is written directly or through the color-difference data reduction process 51*b* into the memory 52 (see FIG. 2) in accordance with the performance of the CPU 51. Then, in the CPU 51, the inverse quantization/inverse DCT process 51*c* is performed on the data written into the memory 52.

FIGS. 8A and 8B are diagrams illustrating an example of the Cb and Cr data on the memory in 4:2:2 format.

When moving image data in 4:2:2 format is inputted, if the performance of the CPU 51 is sufficiently high and the moving image data in 4:2:2 format may be processed at a sufficiently high speed, the data in 4:2:2 format is written into the memory 52. In this case, when one frame of the moving image is divided into SMB (Section Macro Block) lines as shown in FIG. 8A, for example, CbCr data is written into the memory 52 without any blank space as shown in FIG. 8B.

The inverse quantization/inverse DCT process 51*c* (see FIG. 4) is performed on the CbCr data written without any blank space as shown in FIG. 8B. Note that the inverse quantization/inverse DCT process 51*c* is similarly performed on Y data, but the Y data is the same in 4:2:2 format, 4:2:0 format, and 4:1:0 format, and thus the description concerning the Y data is omitted.

FIGS. 9A and 9B are diagrams illustrating an arrangement example of CbCr data on the memory in 4:2:0 format.

When moving image data in 4:2:2 format is inputted, the capacity may be insufficient for processing the moving image data in this format, depending on the performance of the CPU 51. In this case, the color-difference data reduction process 51*b* (see FIG. 4) is performed. Here, when the CPU 51 has performance which allows moving image data in 4:2:0 format to be processed at a sufficiently high speed, moving image data in 4:2:0 format is generated from the moving image data in 4:2:2 format by the color-difference data reduction process 51*b*. The generated moving image data in 4:2:0 format is written into the memory 52, and the inverse quantization/inverse DCT process 51*c* is performed in the CPU 51 on the written data.

When one frame of the moving image is divided into a plurality of SMB lines as shown in FIG. 9A similarly to the case of FIG. 8A, CbCr data is written into the memory as shown in FIG. 9B such that only half is filled as compared to the case of FIG. 8B. The other half remains blank and there is no data therein. Thus, the inverse quantization/inverse DCT process 51*c* is performed on the half in which data is written, and the processing load for the color-difference data CbCr is half that in the case of FIG. 8B (in the case of 4:2:2 format).

When the capacity is insufficient even for the moving image data in 4:2:0 format due to the performance of the CPU 51, the moving image data in 4:2:0 format is transformed in the color-difference data reduction process 51*b* to moving image data in 4:1:0 format shown in FIG. 7C. In this case, although not shown, the data volume of CbCr data on the memory 52 is reduced further, and "no-data" blocks are increased further as compared to FIG. 8B. Therefore, the processing load of the inverse quantization/inverse DCT process 51*c* is reduced further.

The moving image data generated by the inverse quantization/inverse DCT process 51*c* in the CPU 51 is sent to the GPU 541 (see FIG. 4). In the GPU 541, a motion compensation/prediction process 541*a* and a deblocking process 541*b* are performed, and moving image data obtained thus for display is written into an output buffer 541*c*. The moving image data written into the output buffer 541*c* becomes a video image output, and a moving image is displayed on the display screen 31. The motion compensation/prediction process 541*a* and the deblocking process 541*b* are general data processes in MPEG, and thus the detailed description thereof is omitted.

FIGS. 10 and 11 are flowcharts of a reproduction application.

Figure 12:
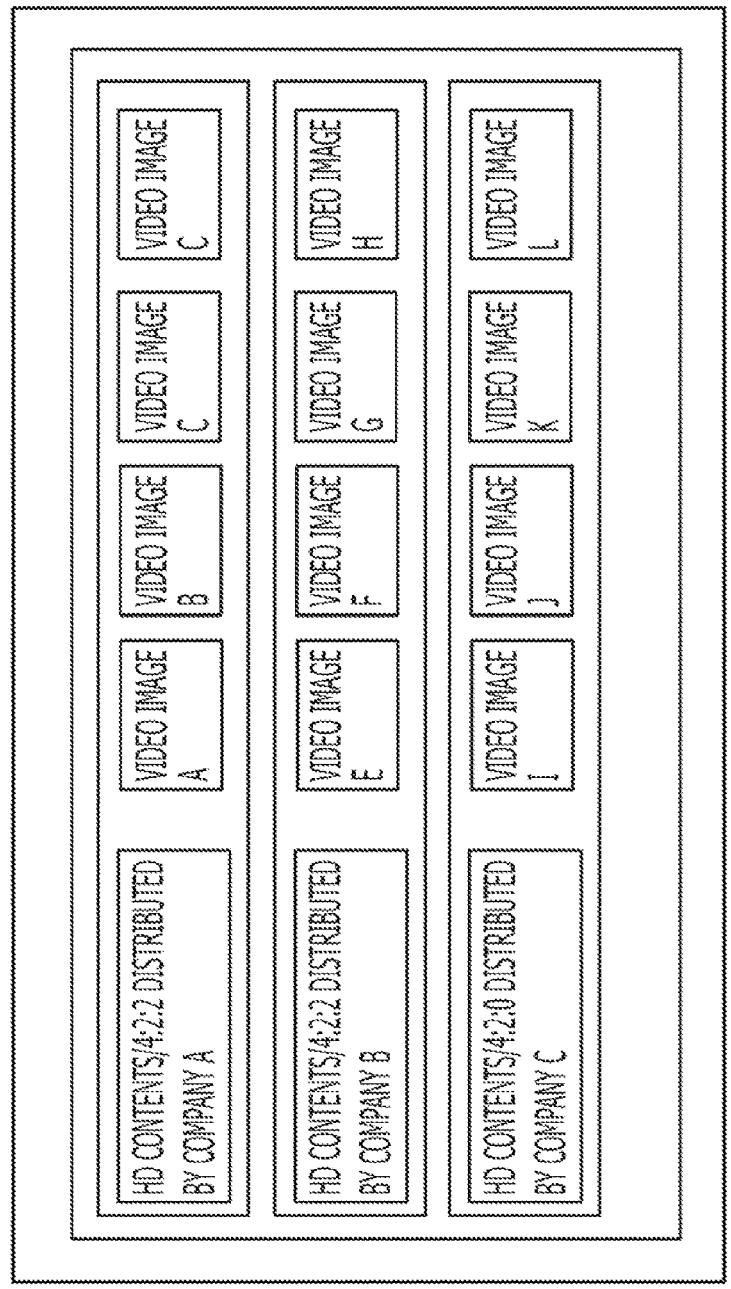
FIG. 12 is a diagram illustrating an example of a menu screen which is displayed on a display screen (see FIG. 2) when the reproduction application shown in FIGS. 10 and 11 is activated.

FIG. 12 is a diagram illustrating an example of a menu screen which is displayed on the display screen 31 (see FIG.

Figure 13:
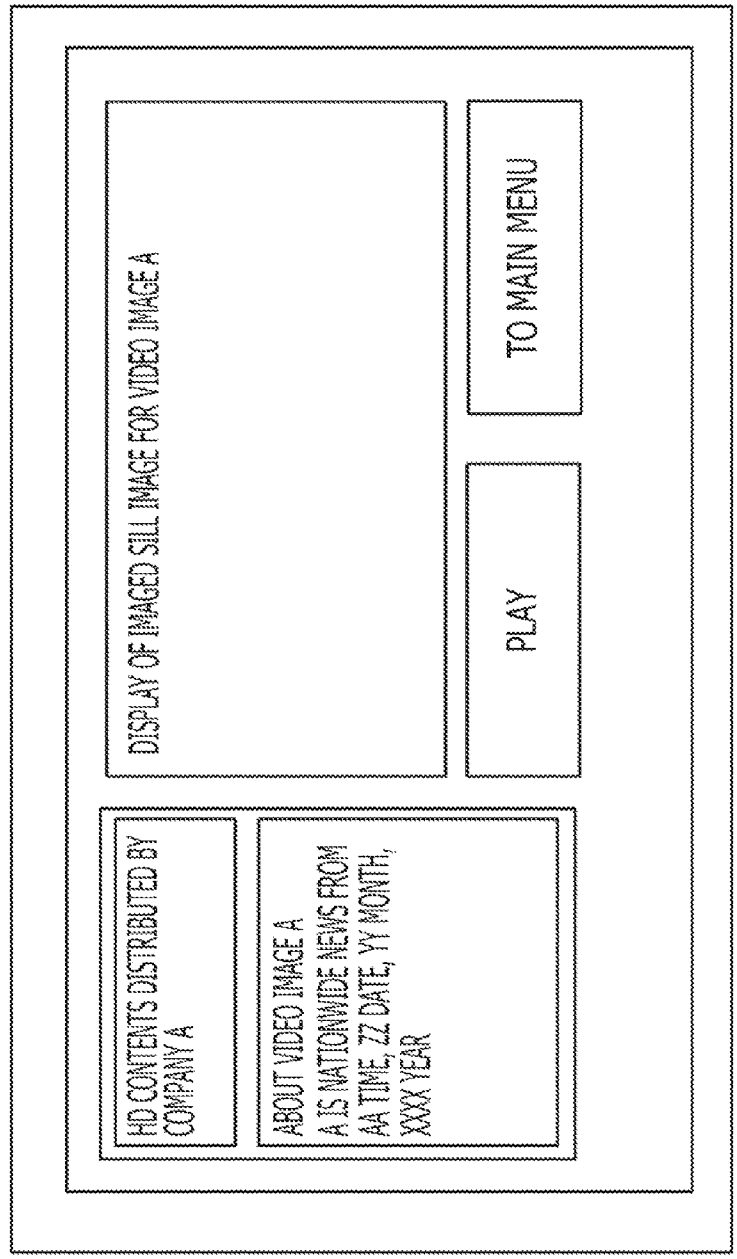
FIG. 13 is a diagram illustrating an example of a display screen when "VIDEO IMAGE A" is selected on the menu screen shown in FIG. 12.

2) when the reproduction application shown in FIGS. 10 and 11 is activated. In addition, FIG. 13 is a diagram illustrating an example of a display screen when "VIDEO IMAGE A" is selected on the menu screen shown in FIG. 12.

When the reproduction application shown in FIGS. 10 and 11 is activated, for example, the menu screen as shown in FIG. 12, which shows a moving image contents list downloaded from the computer network (e.g., the Internet) and stored in the HDD 56, is displayed. For example, when "VIDEO IMAGE A" is selected on the menu screen, the screen shown in FIG. 13 is displayed. When "PLAY" is selected on the screen shown in FIG. 13, reproduction of the video image A is started. On the other hand, "TO MAIN MENU" is selected on the screen shown in FIG. 13, the menu screen shown in FIG. 12 is returned to.

A description will be given along the flowcharts of the reproduction application shown in FIGS. 10 and 11.

When the reproduction application is activated, performance of the CPU 51 of the laptop PC 10, such as operating speed, is detected from apparatus information, such as BIOS information, which is stored in the nonvolatile memory 53 (see FIG. 3) of the laptop PC (the laptop PC 10 shown in FIGS. 2 and 3) which performs the moving image reproduction (step S01).

Next, it is determined whether or not the detected CPU performance enables a video image (in this example, the video image A; 4:2:2 format), which is selected to be reproduced at this time, to be reproduced at a sufficiently high speed. Specifically, a CPU utilization for this reproduction process is predicted, and when the predicted utilization is equal to or less than a threshold, it is determined that the reproduction process may be performed at a sufficiently high speed. Here, first, the case will be described where it is determined that the video image selected at this time may be reproduced at a sufficiently high speed. When the reproduction process may be performed at a sufficiently high speed, the processing proceeds to step S11.

At step S11, it is determined whether or not the moving image reproducing process is cancelled or ended. Cancellation/end of the process occurs when the moving image of this time is reproduced to the end, or when an instruction for cancellation is made by the user. When the cancellation/end of the process occurs, the reproduction application ends. When the process cancellation/end does not occur, a moving image content is read out from the HDD 56 and inputted to the memory 52 (step S12), and the moving image reproducing process is performed (steps S13 to S19). As described above, steps S13 to S16 in the moving image reproducing process (steps S13 to S19) are processes performed in the CPU 51, and steps S17 to S19 are processes performed in the GPU 541.

At step S13, YCbCr data is generated from encoded moving image data by an entropy decoding process. Here, the YCbCr data handles a situation in which high-speed processing is possible even without performing the color-difference data reduction process. Thus, the YCbCr data generated by the entropy decoding process (step S13) is memory-mapped into the memory 52 (see FIG. 3) (step S15; see FIG. 8). Next, an inverse quantization/inverse DCT process is performed on the data mapped into the memory 52 (step S16). Then, the moving image data after the inverse quantization/inverse DCT process is sent to the GPU 541 (see FIG. 4). In the GPU 541, a motion compensation/prediction process (step S17) and a deblocking process (step S18) are performed, and moving image data for display is reproduced and written into an output buffer (step S19). Then, a moving image based on the moving image data written into the output buffer is displayed on the display screen 31 shown in FIG. 2.

The following will describe the case where the processing capacity of the CPU 51 may not keep up with processing of the video image selected to be reproduced at this time (in this example, the video image A, 4:2:2 format) but the processing capacity of the CPU 51 becomes sufficient when the video image A is transformed to 4:2:0 format.

In this case, the processing proceeds via step S02 in FIG. 10 to step S20 in FIG. 11.

Here, in order to reduce the data volume of color-difference data, a color-difference data reduction engine which is one program component is read from the HDD 56 into the memory 52. Of steps S21 to S29 after step S20, steps S21 to S23 and S25 to S29 excluding step S24 are the same processes as steps S11 to S13 and S15 to S19, respectively, shown in FIG. 10, and thus the overlap description is omitted. In FIG. 11, a color-difference data reduction process at step S24 is added, in comparison to FIG. 10. The color-difference data reduction process (step S24) is performed by the color-difference data reduction engine which is the program component read into the memory 52 at step S20. The contents of the color-difference data reduction process have been already described with reference to FIGS. 8 and 9 and the like, and the overlap description is omitted.

When the data volume of the color-difference data is reduced, the color resolution of the moving image is slightly reduced but the resolution of the image remains the same as that of the original moving image data. Thus, reproduction is possible by a moving image reproducing apparatus, such as the laptop PC 10 (see FIG. 2), having a CPU of low specification.

The case has been described where the moving image based on the reproduced moving image data for display is displayed on the display screen 31. However, the moving image data for display does not need to be displayed on the reproducing apparatus itself. For example, the moving image data for display may be recorded in a portable recording medium such as a DVD and a Blu-ray disc, or may be outputted without any change and displayed on another image display apparatus.

Further, data in YCbCr format has been described as an example. However, instead of this, the present case is also applicable to data in YUV format. Moreover, the present case is also applicable to moving image data having luminance data and color data.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A moving image reproducing apparatus comprising:
a memory; and
a processor coupled to the memory, the processor being configured to:
obtain a first moving image data having a luminance data representing luminance of an image and a color data representing color of the image, and
generate a second moving image data having the same luminance data as the luminance data of the first moving image data and a color data whose data volume is reduced within a capacity of the processor performing a moving image display process, by reducing a data volume of the color data of the first moving image data based on the capacity of the processor performing the moving image display process.

2. The moving image reproducing apparatus according to claim 1, wherein the processor is further configured to:
when the first moving image data is a moving image data in a data format which exceeds the capacity, reduce the data volume of the color data of the first moving image data to a data volume corresponding to the capacity.

3. The moving image reproducing apparatus according to claim 1, wherein
the color data is a component changeable separately from the luminance data in a color space of the image.

4. The moving image reproducing apparatus according to claim 1, wherein
the color data is a color difference data against the luminance data in a color space of the image.

5. The moving image reproducing apparatus according to claim 1, wherein
the luminance data and the color data are components in a color space which uses a YUV color model, a Y' UV color model, a YCbCr color model, or a YPbPr color model.

6. The moving image reproducing apparatus according to claim 1, wherein
the processor is configured to reduce the data volume of the color data of the first moving image data based on a utilization rate of the processor.

7. The moving image reproducing apparatus according to claim 1, wherein the processor is configured to:
generate a third moving image data for the moving image display process, based on the second moving image data, and
output the third moving image data.

8. The moving image reproducing apparatus according to claim 7, wherein the processor is further configured to:
display a moving image on a display screen of a display based on the third moving image data.

9. The moving image reproducing apparatus according to claim 1, wherein the capacity of the processor corresponds to an operating speed.

10. A moving image reproducing method, the method comprising:
obtaining a first moving image data having a luminance data representing luminance of an image and a color data representing color of the image; and
generating, using a processor, a second moving image data having the same luminance data as the luminance data of the first moving image data and a color data whose data volume is reduced within a capacity of the processor performing a moving image display process, by reducing a data volume of the color data of the first moving image data based on the capacity of the processor performing the moving image display process.

11. The moving image reproducing method according to claim 10, wherein
the reducing reduces the data volume of the color data of the first moving image data to a data volume corresponding to the capacity, when the obtained first moving image data is a moving image data in a data format which exceeds the capacity.

12. The moving image reproducing method according to claim 10, further comprising:
generating a third moving image data for the moving image display process, based on the second moving image data; and
outputting the third moving image data.

13. The moving image reproducing method according to claim 12, wherein
the outputting outputs the third moving image data to a display to display a moving image based on the third moving image data.

14. The moving image reproducing method according to claim 10, wherein the capacity of the processor corresponds to an operating speed.

15. A non-transitory computer-readable recording medium having recorded therein a program which is executed by a moving image reproducing apparatus, the program causing the moving image reproducing apparatus to perform a method, the method comprising:
obtaining a first moving image data having a luminance data representing luminance of an image and a color data representing color of the image; and
generating a second moving image data having the same luminance data as the luminance data of the first moving image data and a color data whose data volume is reduced within a capacity of a processor performing a moving image display process, by reducing a data volume of the color data of the first moving image data based on the capacity of the processor performing the moving image display process in the moving image reproducing apparatus.

16. The non-transitory computer-readable recording medium according to claim 15, wherein
the reducing reduces the data volume of the color data of the first moving image data to a data volume corresponding to the capacity, when the obtained first moving image data is a moving image data in a data format which exceeds the capacity.

17. The non-transitory computer-readable recording medium according to claim 15, wherein
generating a third moving image data for the moving image display process, based on the second moving image data; and
outputting the third moving image data.

18. The non-transitory computer-readable recording medium according to claim 17, wherein
the outputting outputs the third moving image data to a display which displays a moving image such that the moving image is based on the third moving image data.

19. The non-transitory computer-readable recording medium according to claim 15, wherein the capacity of the processor corresponds to an operating speed.

* * * * *